July 21, 1936.  A. Y. DODGE  2,048,436
BRAKE
Filed May 22, 1933  2 Sheets-Sheet 1
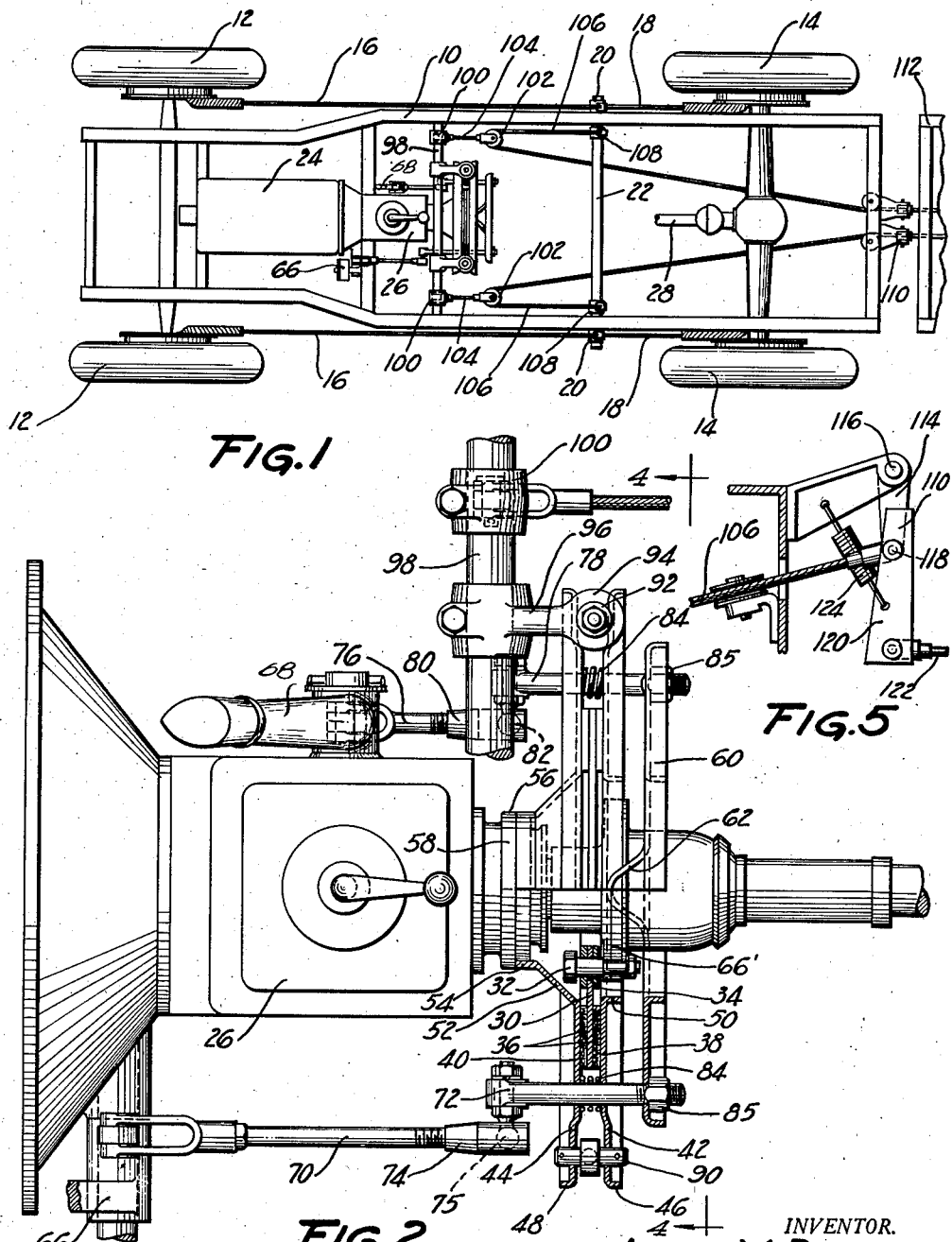
INVENTOR.
ADIEL Y. DODGE
BY H. O. Clayton
ATTORNEY

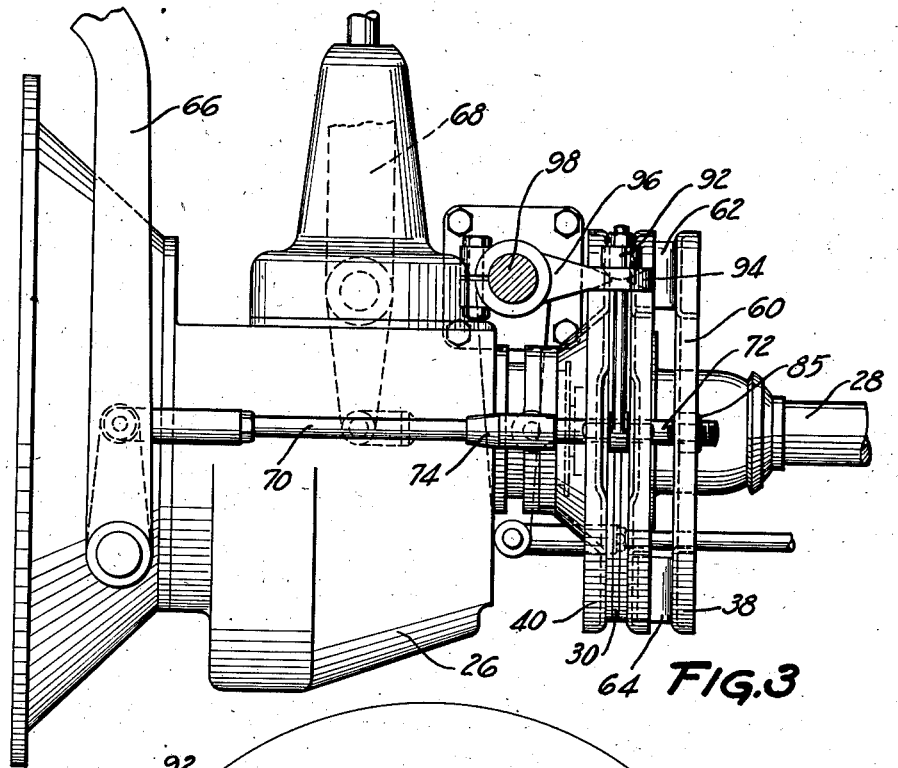
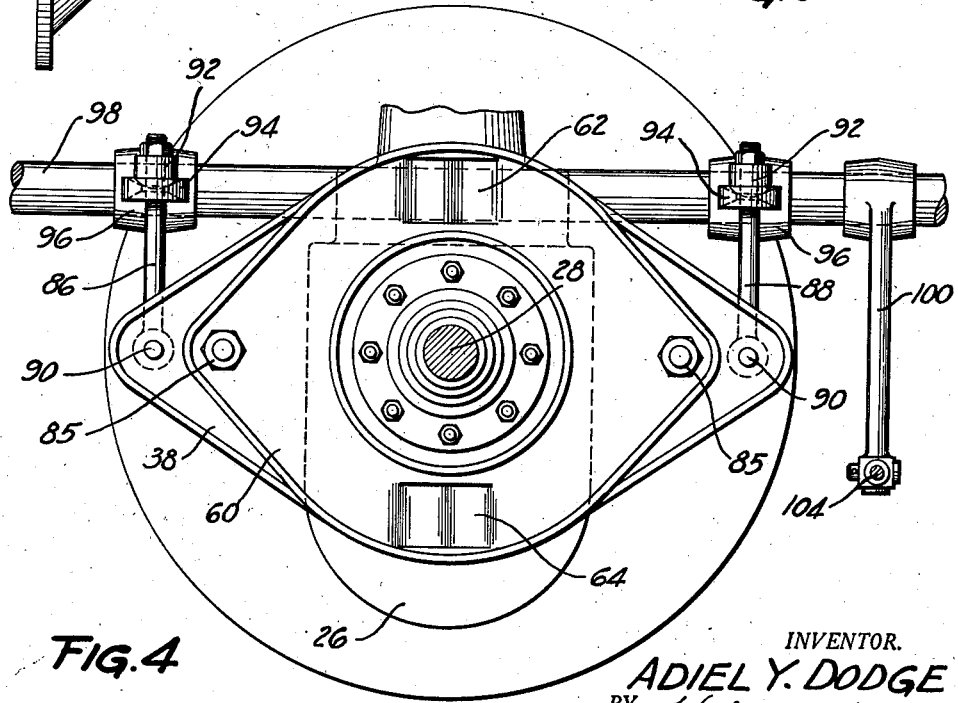

Patented July 21, 1936

2,048,436

UNITED STATES PATENT OFFICE 2,048,436

BRAKE

Adiel Y. Dodge, South Bend, Ind., assignor to Bendix Aviation Corporation, South Bend, Ind., a corporation of Delaware Application May 22, 1933, Serial No. 672,100

20 Claims. (Cl. 188—140)

This invention relates in general to improvements in power brake mechanism for operating the brakes of an automotive vehicle and more particularly to a power mechanism of the so-called mechanical servo-type wherein a driver controlled propeller shaft brake serves to apply the conventional wheel brakes.

With such a brake applying mechanism the operator may selectively control the actuation of the servo-brake unit and thereby control the operation of the wheel brakes, the servo-brake utilizing the kinetic energy of the moving vehicle transmitted through the propeller shaft to do work in applying the wheel brakes and to act as a primary brake acting through the propeller shaft and rear wheels to aid the wheel brakes in retarding the movement of the vehicle.

It is the principal object of the invention to provide a mechanical servo-brake operating mechanism of the disk type, of simple yet rugged design having relatively few moving parts, and withal efficient and effective for the purpose intended.

A further object of the invention is to provide a servo-mechanism, the principal elements of which may be fabricated of stampings, insuring a cheaply manufactured product.

Yet another feature of the invention is to provide a mechanical servo-mechanism of the so-called double-acting type, that is one which is operative irrespective of the direction in which the vehicle is moving.

The invention also contemplates the provision of two separate and distinct manually operable members, either of which may be employed to operate the servo-mechanism to the exclusion of the remaining manually operable member, the structure being such that if desired both of said members may be concurrently or successively operated to apply the servo-mechanism.

A further feature of the invention lies in the provision of a simple form of manually operated applying means for the friction elements of a disk type servo-mechanism wherein a minimum of movement and applying force is necessary to operate the applying means.

A further object of the invention is to provide a disk type of servo-unit designed to cooperate with the power transmission mechanism of the conventional car with a minimum of alteration thereof, the servo-unit to be installed immediately in the rear of the transmission housing.

Yet another object of the invention resides in the provision of a simple yet effective form of so-called equalized brake hook-up interconnecting the servo-unit, the wheel brakes of the vehicle and the wheel brakes of a trailer unit attached to the vehicle.

Other objects of the invention and desirable details of construction and combinations of parts will become apparent from the following description of a preferred embodiment, which description is taken in conjunction with the accompanying drawings, in which:

Figure 1 is a diagrammatic plan view of so much of an automobile and a connected trailer as is necessary to illustrate the invention;

Figure 2 is a plan view on an enlarged scale of the servo-mechanism constituting the present invention;

Figure 3 is a side elevation of the mechanism of Figure 2;

Figure 4 is a front elevational view of the servo-mechanism looking in the direction of the arrows 4—4 in Figure 2; and Figure 5 is a detailed view of the coupling member interconnecting the trailer brakes with those of the automobile.

As will be apparent from Figure 1, the mechanical servo or booster mechanism, while useful with brakes of other kinds, is especially adapted for use in an automobile having four-wheel brakes. The automobile will be hereinafter referred to as a tractor unit, inasmuch as the invention also includes a trailer unit. In this figure the chassis frame of the tractor unit is indicated at 10 and is supported by dirigible front wheels 12 and by rear wheels 14, the front wheels being provided with brakes (not shown) operated by pulling on links 16 and the rear wheels being provided with brakes (not shown) operated by pulling on links 18, both sets of links being connected to a crank arm 20 on a cross shaft 22. The tractor is driven by an engine 24 operating through a transmission 26 to drive the rear wheels through a propeller or drive shaft 28. All of the aforementioned parts may be of any desired construction and are therefor shown in the accompanying drawings in conventional form.

The invention about to be described is directed to a so-called mechanical servo-mechanism for operating the brakes of the tractor and trailer, and derives its power from the kinetic energy of the moving vehicle.

Referring to Figures 2, 3, and 4, disclosing in detail the elements of the servo-mechanism, 30 indicates a rotor member, which is preferably fabricated as a stamped steel disk, the same being orificed at its center to be concentrically sleeved over the propeller shaft mechanism and non-rotatably but slidably secured to the shaft by studs 32 secured to a flange 66' on the propeller shaft, said studs extending through openings 34 in the inner periphery of the rotor member. To each side of the rotor disk, at its outer periphery, is secured a friction mat 36 of any suitable material.

The stator element of the servo-unit preferably comprises oppositely disposed disk stampings 38 and 40 housing between them the rotor element 30, both stampings being orificed at their centers to be concentrically sleeved over the propeller shaft. The stampings are preferably pressed outwardly at their peripheral portions at 42 and 44 and are provided with outwardly turned annularly extending reenforcing flanges 46 and 48. Disk 38 is provided with an outwardly turned reenforcing flange 50 at its inner periphery, and disk 40 is provided at its inner periphery with a frusto-conical shaped hub portion 52 having a peripheral flange 54 seated upon a rabbeted or shoulder portion 56 on a part 58 extending from a transmission housing 26. A stamped steel pressure or camming member 60, which may be of diamond shape, as disclosed in Figure 4, parallels the rotor and stator members and is provided with embossed lugs 62 and 64, normally spaced from but adapted to contact the outer side face of the stator stamping member 38, said lugs normally supported upon the peripheral edge of the flange 66'.

According to an important feature of the invention the camming member 60 is arranged to be forced into contact with the stator member by either one or both of two manually operable means comprising a foot operated brake pedal 66 and a hand operated lever member 68. The pedal 66 is connected to the camming member by interconnected links 70 and 72 preferably adjustable as to length by a turnbuckle 74, housing a universal joint 75, and the hand lever 68 may be connected with the camming member by interconnected links 76 and 78 similarly adjustable as to length by turnbuckle 80, housing a universal joint 82. Links 72 and 78 extend through openings in the parts of the stator element and are also preferably sleeved through spring members 84, serving as separating or return spring members for the rotor and stator elements of the servo-unit, said links are connected to the plate 60 by nuts 85.

The stator unit is preferably operatively interconnected with the wheel brakes by means of oppositely disposed links 86 and 88 pivotally mounted at their inner ends on cylindrical pins 90 extending through stator disks 38 and 40 and pivotally secured at their outer ends, by means of spherically headed nuts 92 seated in recessed lugs 94 on the ends of crank arms 96 secured to a crank shaft 98. The shaft 98 is operably connected with the wheel brakes by means of a crank arm 100, the arm being connected to a shiv 102 by a cable 104. A cable 106 extends about the shiv, one end being connected to an arm 108 on the cross shaft and the other end being connected to a coupling 110 interconnecting the aforementioned tractor wheel brakes with the brakes on a trailer 112. The coupling 110, detailed in Figure 5, comprises an arm 114 pivotally secured, at its ends, to the chassis at 116 and to the cable 106 at 118. A stop member 120 is pivotally secured to the arm 114 at 118, said member housing the arm 114 at its upper end and connected, at its lower end, to a cable 122 extending to the trailer brakes (not shown). A spring 124 serves to move the stop member to the dotted line position shown in the figure when and if the trailer brakes are for any reason inoperative. The tractor and trailer brakes are thus equally applied by virtue of the cable and shiv arrangement disclosed, and should the trailer brakes become inoperative, the stop 120 automatically becomes operative as an anchor for the cable 106, thus insuring the continued operation of the tractor brakes.

Describing the operation of the servo-brake operating mechanism, actuation of either the pedal 66 or hand lever 68 serves to rock the camming member 60 about one or the other of the nuts 85 as a fulcrum, the lugs 62 and 64 becoming the points of application of the force of the member acting as a lever of the second class. The rotor and stator units are thus forced into contact, the shoulder 56 acting as an abutment for the flange 54 on the stator plate 40. The frictional resistance developed between the mats 36 and the coacting faces of the stator disks 38 and 40 serves to impart an angular movement to the stator member to operate the wheel brakes, the rotor and stator elements being rotated as a unit either clockwise or counterclockwise, depending upon the direction of movement of the vehicle. It will be noted that the brakes are positively operated irrespective of the direction of angular movement of the servo-elements, for one or the other of the links 86 or 88 will function to rotate the shaft 98, the remaining link freely passing up through the opening in its lug 94.

It is to be particularly noted that the driver may, i. e. in an emergency, operate both the pedal 66 and the lever 68 simultaneously, moving the pressure member bodily laterally to thus increase the force of application of the servo-brake, and consequently increase its output and the force of application of the wheel brakes; or the driver may, if desired, operate the two successively.

While one illustrative embodiment has been described, it is not my intention to limit the scope of the invention to that particular embodiment, or otherwise than by the terms of the appended claims.

I claim:

1. A vehicle having, in combination, wheel brakes, a propeller shaft, and a mechanical servo-mechanism for operating said brakes comprising a rotor member provided with friction mats on opposite sides operatively connected with said shaft to be rotated thereby, a stator member operatively connected with said wheel brakes, and applying means for moving said stator member into contact with said rotor member including a plurality of driver controlled members selectively operable to operate said members either individually or collectively at the will of the driver.

2. A vehicle having, in combination, wheel brakes, a propeller shaft, and a mechanical servo-mechanism for operating said brakes comprising a friction disk rotor member operatively connected with said shaft to be rotated thereby, a stator member comprising a plurality of disk members, and applying means for said servo-mechanism including a pressure plate for moving said stator member into contact with said rotor member, and further including a plurality of driver controlled members selectively operable to operate said members either individually, successively or collectively at the will of the driver.

3. A vehicle having, in combination, wheel brakes, a power transmission including a propeller drive shaft, and a mechanical servo-mechanism for operating said wheel brakes comprising a friction disk rotor member operatively connected with said drive shaft to be rotated thereby, a stator member comprising a plurality of disk members, applying means including a pressure plate for moving said stator member into contact with said rotor member, and manual means including a brake pedal and an emergency lever member selectively operable individually or collectively at the will of the driver, to actuate the applying means to move the stator member into contact with the rotor member.

4. Brake applying mechanism for an automotive vehicle provided with wheel brakes and a drive shaft, said applying mechanism comprising, a rotor element provided with friction mats on opposite sides thereof secured to said shaft to be operated thereby in either direction of rotation of said shaft, a stator element, applying means for forcing said elements into driving contact comprising a plurality of manually operable members, each of said members operable at the will of the driver to individually force said elements into contact, and means interconnecting said stator element and brakes.

5. Brake applying mechanism for an automotive vehicle provided with wheel brakes and a drive shaft comprising, in combination, a rotor element secured to said shaft to be operated thereby in either direction of rotation of said shaft, a stator element operably connected with said wheel brakes and comprising a plurality of disks secured together to rotate as a unit, applying means for forcing said elements into driving contact with each other comprising a plurality of manually operable members, each of said members operable at the will of the driver to individually force said elements into contact, said applying means further including a member so constructed and arranged with respect to said stator member as to permit of a concurrent operation of both of said manually operable members.

6. Brake applying mechanism for an automotive vehicle provided with wheel brakes and a drive shaft comprising, a friction disc rotor element secured to said shaft to be operated thereby in either direction of rotation, a stator element, applying means including a plurality of manually operable members for forcing said elements into driving contact to operate the wheel brakes, each of said members operable at the will of the driver to individually force said elements into contact, and means interconnecting said stator element and brakes, said latter means comprising a plurality of alternately operable devices operable to actuate said wheel brakes irrespective of the direction of rotation of said stator member.

7. Brake applying mechanism for an automotive vehicle provided with wheel brakes and a drive shaft comprising, in combination, a servo-unit including a rotor member drivably secured to said shaft, a stator member operably connected with said wheel brakes, and means for effecting a clutching engagement between said members comprising a lever member contactible with said stator member, and a manually operable member secured to each end of said lever member.

8. Brake applying mechanism for an automotive vehicle provided with wheel brakes and a drive shaft comprising, in combination, a servo-unit including a rotor member drivably secured to said shaft, a stator member operably connected with said wheel brakes, and means for effecting a driving engagement between said members comprising a pressure member, a plurality of manually operable means, one secured to each end of said pressure member, said pressure member provided at its center with a projection contactible with said stator member whereby with operation of one of said manually operable means the remaining manually operable means, at its connection with said pressure member, serves as a fulcrum for said pressure member.

9. Brake applying mechanism for an automotive vehicle provided with wheel brakes and a drive shaft comprising, in combination, a servo-unit including a rotor member drivably secured to said shaft, a stator member operatively connected with said wheel brakes by a plurality of alternately operable devices operable to actuate said wheel brakes irrespective of the direction of rotation of said stator member, and means for effecting a driving engagement between said members comprising a lever member contactible with said stator member, and a manually operable member secured to each end of said lever member.

10. Brake applying mechanism for an automotive vehicle provided with wheel brakes and a drive shaft and comprising, in combination therewith, a servo-unit including a rotor member drivably secured to said shaft, a stator member operably connected with said wheel brakes, and means for effecting a driving engagement between said members comprising a pressure disk acting as a lever, means for fulcruming said disk at one of its ends, means on said disk at its center adapted to contact said stator member, and a manually operable means connected to the other end of said disk to operate the same to effect the driving engagement between said rotor and stator members.

11. Brake applying mechanism for an automotive vehicle having wheel brakes and a rotatable element driven by the momentum of the vehicle comprising, in combination therewith, a driving friction element secured to the aforementioned rotatable element, a driven friction element operably connected to the wheel brakes, and means for effecting a driving engagement between said elements to operate the wheel brakes comprising a floating member acting as a pressure or camming member, separate driver operated members, one connected to each end of said camming member, and means on said camming member contactible with said driven friction element, said driver operated members being so constructed and arranged as to be either jointly or severally operable at the will of the driver to act on said camming member and effect the driving engagement between said driving and driven friction elements.

12. Brake applying mechanism for an automotive vehicle having wheel brakes and a rotatable element driven by the momentum of the vehicle and comprising, in combination therewith, a driving friction element comprising a disk member secured to the aforementioned rotatable element, a driven friction element comprising a plurality of interconnected disk members operably connected to the wheel brakes, and means for effecting a driving engagement between said elements to operate the wheel brakes comprising a floating disk-like member acting as a pressure or camming member, separate driver operated members, one connected to each end of said camming member, and means on said camming member contactible with said driven friction element, said driver operated members being so constructed and arranged as to be either jointly or severally operable at the will of the driver to act on said camming member and effect the driving engagement between said driving and driven friction elements.

13. Brake applying mechanism for an automotive vehicle having wheel brakes and a rotatable element driven by the momentum of the vehicle and comprising, in combination therewith, a driving friction element comprising a disk member secured to the aforementioned rotatable element, a driven friction element comprising a plurality of interconnected disk members operatively connected to the wheel brakes by a plurality of alternately operable devices operable to actuate said wheel brakes irrespective of the direction of rotation of said rotatable element, and means for effecting a driving engagement between said elements to operate the wheel brakes comprising a floating disk-like member acting as a pressure or camming member, separate driver operated members, one connected to each end of said camming member, and means on said camming member contactible with said driven friction element, said driver operated members being so constructed and arranged as to be either jointly or severally operable at the will of the driver to act on said camming member and effect the driving engagement between said driving and driven friction elements.

14. Power operated brake applying mechanism for an automotive vehicle having a propeller shaft and comprising, in combination with a brake to be operated, friction means secured to said shaft to rotate therewith, a second friction means, means interconnecting said second-mentioned friction means and wheel brakes, and means for moving both of said aforementioned friction means into engagement with each other comprising a pressure plate paralleling said friction means, and means for bodily moving said plate laterally to force said friction means together.

15. Power operated brake applying mechanism for an automotive vehicle having a propeller shaft and comprising, in combination with a brake to be operated, friction means comprising a rotor disk, faced with friction material and secured to said shaft to rotate therewith irrespective of its direction of rotation, a second friction means comprising two disk plates housing said rotor disk, means interconnecting said second-mentioned friction means and wheel brakes, and means for moving both of said aforementioned friction means into engagement with each other comprising a pressure plate paralleling said friction means, and means for bodily moving said plate laterally to force said friction means together.

16. Power operated brake applying mechanism for an automotive vehicle having a propeller shaft and comprising, in combination with a brake to be operated, friction means comprising a rotor disk, faced with friction material, secured to said shaft to rotate therewith, a second friction means comprising two disk plates housing said rotor disk, means interconnecting said second-mentioned friction means and wheel brakes, and means for moving both of said aforementioned friction means into engagement with each other comprising a pressure plate paralleling said friction means, and means for moving said plate laterally to force said friction means together comprising separate manually operable means secured to diametrically opposite parts of said pressure plate and adapted to be either simultaneously, collectively or successively actuated.

17. Brake servo-mechanism for an automotive vehicle provided with wheel brakes and a drive shaft, a friction rotor disk member secured to said shaft, two interconnected stator friction disk members, one mounted on each side of said rotor disk and provided with alined openings at diametrically spaced parts on said disk members, a camming disk member paralleling said rotor and stator members and adapted to contact said stator member to force the same into contact with said rotor member, manually operable means for forcing all of said disk members together including link members extending through the openings in the stator member and secured at their ends to said camming member, together with means interconnecting said stator member and wheel brakes.

18. Brake servo-mechanism for an automotive vehicle provided with wheel brakes and a drive shaft, a friction rotor disk member secured to said shaft, two interconnected stator friction disk members, one mounted on each side of said rotor disk and provided with alined openings at diametrically spaced parts on said disk members, a camming disk member paralleling said rotor and stator members and adapted to contact said stator member to force the same into contact with said rotor member, manually operable means for forcing all of said disk members together including link members extending through the openings in the stator member and secured at their ends to said camming member, together with means interconnecting said stator member and wheel brakes comprising alternately operable devices operable to actuate said wheel brakes irrespective of the direction of rotation of said stator members, said alternately operable devices comprising two link members swiveled to said stator disk members at diametrically spaced parts of said members and extending parallel to the plane of said members.

19. Brake servo-mechanism for an automotive vehicle provided with wheel brakes, a cross shaft and a drive shaft, a friction rotor disk member secured to said drive shaft, said member having friction material secured to each side thereof, two interconnected stator friction disk members, one mounted on each side of said rotor disk, a camming disk member paralleling said rotor and stator members and adapted to contact said stator member to force the same into contact with said rotor member, manually operable means for forcing all of said disk members together including link members extending through openings in the stator member and secured at their ends to said camming member, together with alternately operable devices interconnecting said stator disk members and wheel brakes, said devices comprising two link members swiveled to said stator members at diametrically spaced parts of said members and extending parallel to the plane of said members, and crank arms interconnecting said cross shaft and last-mentioned link members.

20. Servo-brake operating mechanism for an automotive vehicle provided with wheel brakes, a transmission housing and a drive shaft, a rotor friction member slidably but non-rotatably mounted on said drive shaft immediately in rear of said transmission housing, a stator friction member comprising two disks housing said rotor member and angularly movable with said member and laterally relative thereto, one of said stator disks adapted to contact said transmission housing, means for forcing said stator and rotor members into engagement to rotate as a unit, said housing acting as an abutment, and means interconnecting said stator member and wheel brakes to actuate the latter with angular movement of said stator member.

ADIEL Y. DODGE.